United States Patent
Phillips-Grafflin

(10) Patent No.: US 12,032,992 B2
(45) Date of Patent: Jul. 9, 2024

(54) METHODS AND SYSTEMS FOR PERFORMING TASKS BASED ON A GLOBAL MODEL

(71) Applicant: Toyota Research Institute, Inc., Los Altos, CA (US)

(72) Inventor: Calder Phillips-Grafflin, Jamaica Plains, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 364 days.

(21) Appl. No.: 16/516,902

(22) Filed: Jul. 19, 2019

(65) Prior Publication Data

US 2021/0019180 A1    Jan. 21, 2021

(51) Int. Cl.
*G06F 9/48* (2006.01)

(52) U.S. Cl.
CPC .................. *G06F 9/4881* (2013.01)

(58) Field of Classification Search
CPC ..... G06F 9/4881; G06F 16/29; G05D 1/0088; G05D 1/0221; B60W 2556/50; B60W 2552/20; B60W 50/0097
See application file for complete search history.

(56) References Cited

U.S. PATENT DOCUMENTS

| | | | |
|---|---|---|---|
| 9,373,163 B2 | 6/2016 | Wersborg et al. | |
| 9,637,310 B1 | 5/2017 | Zou | |
| 9,701,015 B2 | 7/2017 | Buehler et al. | |
| 9,815,191 B2 | 11/2017 | Oleynik | |
| 10,029,698 B2 | 7/2018 | Rao et al. | |
| 10,168,674 B1* | 1/2019 | Buerger | G05D 1/0088 |
| 2017/0350713 A1* | 12/2017 | Bhatia | G05D 1/0246 |
| 2018/0259956 A1* | 9/2018 | Kawamoto | G05D 1/0061 |
| 2020/0095074 A1* | 3/2020 | Byers | B64D 1/22 |
| 2021/0004647 A1* | 1/2021 | Amirloo Abolfathi | G06N 7/01 |

FOREIGN PATENT DOCUMENTS

CN    108638065 A    10/2018

OTHER PUBLICATIONS

Grollman, Daniel H. et al., "Robot learning from failed demonstrations", Accessed Jan. 9, 2019, URL: http://www.first-mm.eu/files/grollman12ijsr.pdf.
Phillips-Grafflin, Calder, "Enabling motion planning and execution for tasks involving deformation and uncertainty", Worcester Polytechnic Institute, Jun. 7, 2017.

* cited by examiner

*Primary Examiner* — Dong U Kim
(74) *Attorney, Agent, or Firm* — Dinsmore & Shohl LLP

(57) ABSTRACT

An embodiment takes the form of a method carried out by a task-execution device. The task-execution device applies a first local-model update to a local model of the task-execution device. The first local-model update is applied based on a first global-model update to a global model of a global-model repository. The task-execution device generates an execution policy based on (i) a received task request identifying a requested task and (ii) the local model including the first local-model update. The task-execution device executes a performance of the requested task based on the generated execution policy, and obtains an observation of the performance of the requested task. Additionally, the task-execution device applies a second local-model update to the local model based on the obtained observation of the performance of the requested task, and provides the global-model repository with an indication of the second local-model update.

19 Claims, 5 Drawing Sheets

METHODS AND SYSTEMS FOR PERFORMING TASKS BASED ON A GLOBAL MODEL

TECHNICAL FIELD

The present disclosure generally relates to task-execution systems and methods carried out by task-execution systems and, more specifically, to systems and methods for performing a task based on a global model.

BACKGROUND

Autonomous and semi-autonomous vehicles, robots, and other devices may be programmed to carry out (or attempt to carry out) a given task. For example, an autonomous vehicle may attempt to navigate to a given location with little or no input from a human driver, relying instead on inputs from sensors (such as radar sensors, lidar sensors, Global Positioning System (GPS) sensors, and cameras) to perceive a surrounding environment of the vehicle and navigate the vehicle based on the perceived environment.

However, performance of a given task by an autonomous vehicle or other device could fail for any number of reasons. For example, an autonomous vehicle may be unable to take a given trajectory as part of the task, perhaps because of adverse traffic conditions or because of inconsistent data received from one or more sensors of the vehicle.

SUMMARY

An embodiment of the present disclosure takes the form of a method carried out by a task-execution device. The method includes applying a first local-model update to a local model of the task-execution device. The first local-model update is applied based on a first global-model update to a global model of a global-model repository. The method further includes generating an execution policy based on (i) a received task request identifying a requested task and (ii) the local model including the first local-model update. The method also includes executing a performance of the requested task based on the generated execution policy, and obtaining an observation of the performance of the requested task. Additionally, the method includes applying a second local-model update to the local model based on the obtained observation of the performance of the requested task, and providing the global-model repository with an indication of the second local-model update.

Another embodiment takes the form of a task-execution device that includes a local model, a processor, and a non-transitory computer-readable storage medium that includes instructions. The instructions, when executed by the processor, cause the task-execution device to apply a first local-model update to the local model based on a first global-model update to a global model of a global-model repository. The first global-model update is based on one or more local-model updates to respective local models of one or more devices other than the task-execution device. The instructions further cause the task-execution device to generate an execution policy based on (i) a received task request identifying a requested task and (ii) the local model including the first local-model update. The instructions also cause the task-execution device to execute a performance of the requested task based on the generated execution policy, and obtain an observation of the performance of the requested task. The instructions additionally cause the task-execution device to apply a second local-model update to the local model based on the obtained observation, and provide the global-model repository with an indication of the second local-model update. The provided indication causes the global-model repository to apply a second global-model update to the global model based on the second local-model update.

A further embodiment takes the form of a task-execution system that includes a task-execution device and a global-model repository. The global-model repository includes a global model, a processor, and a non-transitory computer-readable storage medium that includes model-repository instructions. The task-execution device comprises a local model, a processor, and a non-transitory computer-readable storage medium that includes execution-device instructions. The model-repository instructions, when executed by the processor of the global-model repository, cause the global-model repository to apply a first global-model update to the global model based on one or more local-model updates to respective local models of one or more devices other than the task-execution device. The execution-device instructions, when executed by the processor, cause the task-execution device to apply a first local-model update to the local model based on the first global-model update. The execution-device instructions further cause the task-execution device to generate an execution policy based on (i) a received task request identifying a requested task and (ii) the local model including the first local-model update. The execution-device instructions also cause the task-execution device to execute a performance of the requested task based on the generated execution policy, and obtain an observation of the performance of the requested task. The execution-device instructions additionally cause the task-execution device to apply a second local-model update to the local model based on the obtained observation. The model-repository instructions further cause the global-model repository to apply a second global-model update to the global model based on the second local-model update.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Task-executions systems, task-execution devices, and methods for performing a task based on a global model are disclosed herein. In some embodiments, a task-execution device applies a first local-model update to a local model of the task-execution device. The first local-model update is applied based on a first global-model update to a global model of a global-model repository, which in turn may be based on one or more local-model updates to respective local models of one or more devices other than the task-execution device. The task-execution device generates an execution policy based on (i) a received task request identifying a requested task and (ii) the local model including the first local-model update. The task-execution device executes a performance of the requested task based on the generated execution policy, and obtains an observation of the performance of the requested task. The task-execution device applies a second local-model update to the local model based on the obtained observation, and provides the global-model repository with an indication of the second local-model update, which may cause the global-model repository to apply a second global-model update to the global model based on the second local-model update. By applying a local-model update to a local model based on a global-model update, a given task-execution device can learn to perform tasks based on, for example, the experience of other devices performing tasks. Additionally, by providing a global-model repository with an indication of a local-model update to a local model, a given task-execution device may facilitate other devices learning to perform tasks based on, for instance, the experience of the given task-execution device performing tasks. Various embodiments of task-executions systems, task-execution devices, and methods for performing a task based on a global model will now be described in detail with reference to the drawings.

Example Task-Execution System

Figure 1:
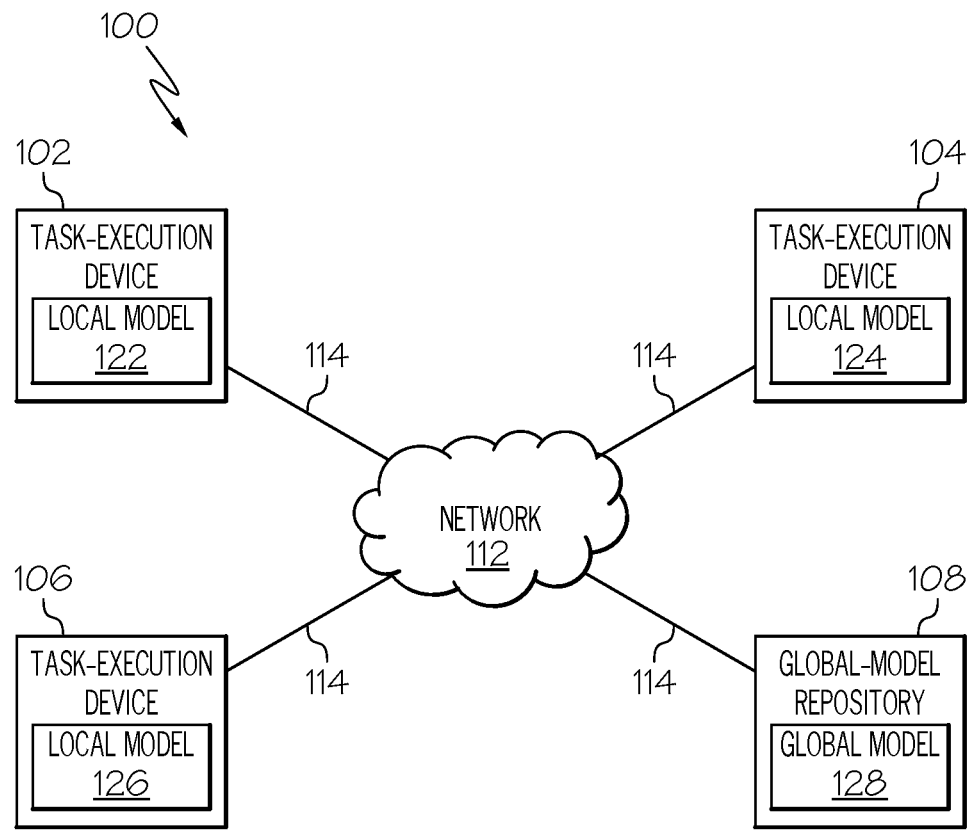
FIG. 1 depicts a block diagram of task-execution system, according to one or more embodiments described and illustrated herein.

FIG. 1 depicts a block diagram of task-execution system, according to one or more embodiments described and illustrated herein. As shown, a task-execution system 100 includes task-execution devices 102, 104, and 106, and a global-model repository 108, each of which are communicatively connected via a network 112 and respective communication links 114. Task-execution devices 102, 104, and 106 include local models 122, 124, and 126, respectively, and global-model repository 108 includes a global model 128.

Task-execution device 102 could take the form of a vehicle (such as an autonomous or semi-autonomous vehicle), a robot, a drone, or any combination of these or other devices capable of carrying out the task-execution-device functions described herein. The task-execution device could include one or more robotic hands for grabbing or manipulating objects, or one or more wheels or robotic feet for moving the task-execution device, among other possibilities. Either or both of task-execution devices 104 and 106 could take a form similar to task-execution device 102. Additional details regarding the task-execution devices are provided below with reference to FIG. 2.

Local model 122 may include data that represents a model, which in turn may represent one or more concepts, rules, constraints, etc., to allow task-execution device 102 to carry out a task. For example, the local model may represent one or more maps, perceived scenes, 3D-pose estimations of objects, or other concepts that allow the task-execution device to understand an environment or a context of (or around) the task-execution device. As another example, the local model may represent a set of rules or constraints to allow the task-execution device to carry out one or more actions for performing the task. For instance, the local model could include a constraint that the task-execution device, if capable of moving or traveling within its environment, should not take a given path or trajectory under certain conditions. Data representing local model 122 could be stored in a data storage of the task-execution device, in a data storage separate from the task-execution device (such as a cloud-based database), or any combination of these, as just a few examples. Local model 122 may take other forms as well, and either or both of local models 124 and 126 could take a form similar to local model 122. Additional aspects of the local models will be described below.

Global-model repository 108 could take the form of a database management system (DBMS) such as a relational or non-relational DBMS, a server computing device, a cloud-computing device, or any combination of these or other global-model repositories. Additional details regarding global-model repository 108 are provided below with reference to FIG. 4.

Global model 128, similar to local models 122, 124, and/or 126, may include data that represents a model, which in turn may represent one or more concepts, rules, constraints, etc., to allow task-execution devices 102, 104, 106, or any other task-execution devices to carry out respective tasks. For example, global model 128 may represent one or more maps, perceived scenes, 3D-pose estimations of objects, or other concepts that allow task-execution devices to understand an environment or a context of (or around) the respective task-execution device. As another example, global model 128 may represent a set of rules or constraints to allow task-execution devices to carry out one or more actions for performing the tasks. For instance, the global model could include a constraint that the task-execution devices, if capable of moving or traveling within their respective environments, should not take a given path or trajectory at one or more specified locations under certain condition. The global model may take other forms as well, and additional aspects of the global model be described below.

Network 112 may include one or more computing systems and at least one network infrastructure configured to facilitate transferring data between one or more entities communicatively connected to network 112. The network may include one or more wide-area networks (WANs) and/or local-area networks (LANs), which may be wired and/or wireless networks. In some examples, the network may include the Internet and/or one or more wireless cellular networks, among other possibilities. The network may operate according to one or more communication protocols such as Ethernet, Wi-Fi, internet protocol (IP), transmission control protocol (TCP), long-term evolution (LTE), and the like. Although the network is shown as a single network, it should be understood that the network may include multiple, distinct networks that are themselves communicatively linked. The network could take other forms as well.

Communication links 114 may communicatively link respective entities with network 112 to facilitate communication between entities communicatively connected to the network. Any of communication links 114 may be a combination of hardware and/or software, perhaps operating on one or more communication-link layers such as one or more physical, network, transport, and/or application layers.

Example Task-Execution Device and Execution-Device Method

Figure 2:
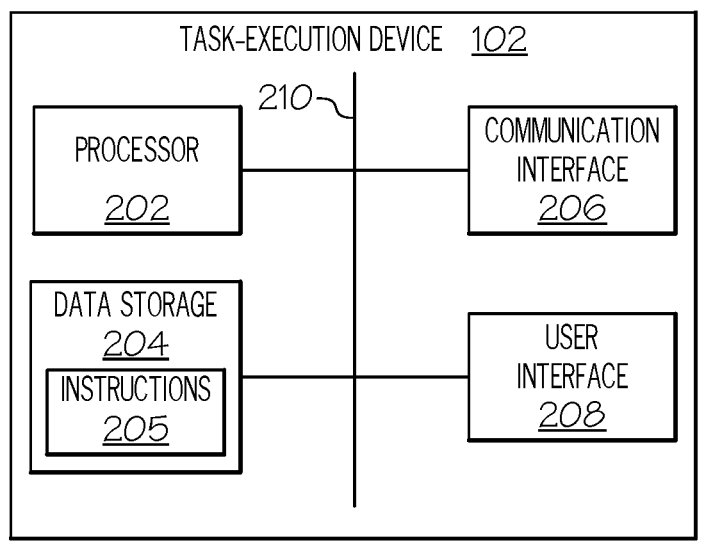
FIG. 2 depicts a block diagram of a task-execution device, according to one or more embodiments described and illustrated herein.

FIG. 2 depicts a block diagram of a task-execution device, according to one or more embodiments described and illustrated herein. As shown, task-execution device 102 includes a processor 202, a data storage 204, a communication interface 206, and a user interface 208, each of which are communicatively connected via a system bus 210. Those of skill in the art will appreciate that task-execution device 102 may include different and/or additional components. For example, in an embodiment, task-execution device 102 does not include user interface 208. Additionally, as explained above, either or both of task-execution devices 104 and 106 could take a form similar to the task-execution device depicted in FIG. 2.

Processor 202 may take the form of one or more general-purpose processors and/or one or more special-purpose processors, and may be integrated in whole or in part with data storage 204, communication interface 206, user interface 208, and/or any other component of task-execution device 102, as examples. Accordingly, processor 202 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 204 may store instructions 205, data representing local model 122, and/or other data, as examples. The data storage may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a relational database managements system (RDBMS), any other non-volatile storage, or any combination of these, to name just a few examples. Data representing local model 122 could be stored as a table, a flat file, data in a filesystem of the data storage, a heap file, a B+ tree, a hash table, a hash bucket, or any combination of these, as examples. In an embodiment, instructions 205 comprise machine-language instructions executable by processor 202, and/or script instructions executable by a script interpreter configured to cause processor 202 to execute the instructions specified in the script instructions. Those having skill in the art will recognize that data storage 204, instructions 205, and data representing local model 122 may take other forms as well.

Communication interface 206 may be any component capable of performing the communication-interface functions described herein. As such, communication interface 206 could take the form of an Ethernet, Wi-Fi, Bluetooth, and/or USB interface, among many other examples. Communication interface 206 may receive data over network 112 via communication links 114, for instance.

User interface 208 may be any component capable of carrying out the user-interface functions described herein. For example, the user interface may be configured to receive input from a user and/or output information to the user. User input might be achieve via a keyboard, a mouse, or another component communicatively linked to task-execution device 102. As another possibility, input may be realized via a touchscreen display of task-execution device 102. Output to a user may be provided via a computer monitor or a loudspeaker (such as a computer speaker) communicatively linked to task-execution device 102, as an example. Some components may provide for both input and output, such as the above-mentioned touchscreen display. Those having skill in the art will understand that user interface 208 may take numerous other forms as well.

System bus 210 may be any component capable of performing the system-bus functions described herein. In an embodiment, system bus 210 is any component configured to transfer data between the processor 202, the data storage 204, communication interface 206, user interface 208, and/or any other component of task-execution device 102. In an embodiment, system bus 210 includes a traditional bus as is known in the art. In other embodiments, system bus 210 includes a serial RS-232 communication link, a USB communication link, and/or an Ethernet communication link, alone or in combination with a traditional computer bus, among numerous other possibilities. In some examples, system bus 210 may be formed from any medium that is capable of transmitting a signal, such as conductive wires, conductive traces, or optical waveguides, among other possibilities. Moreover, system bus 210 may be formed from a combination of mediums capable of transmitting signals. The system bus could take the form of (or include) a vehicle bus, such as a local interconnect network (LIN) bus, a controller area network (CAN) bus, a vehicle area network (VAN) bus, or any combination of these or mediums. Those of skill in the art will recognize that system bus 210 may take various other forms as well.

Figure 3:
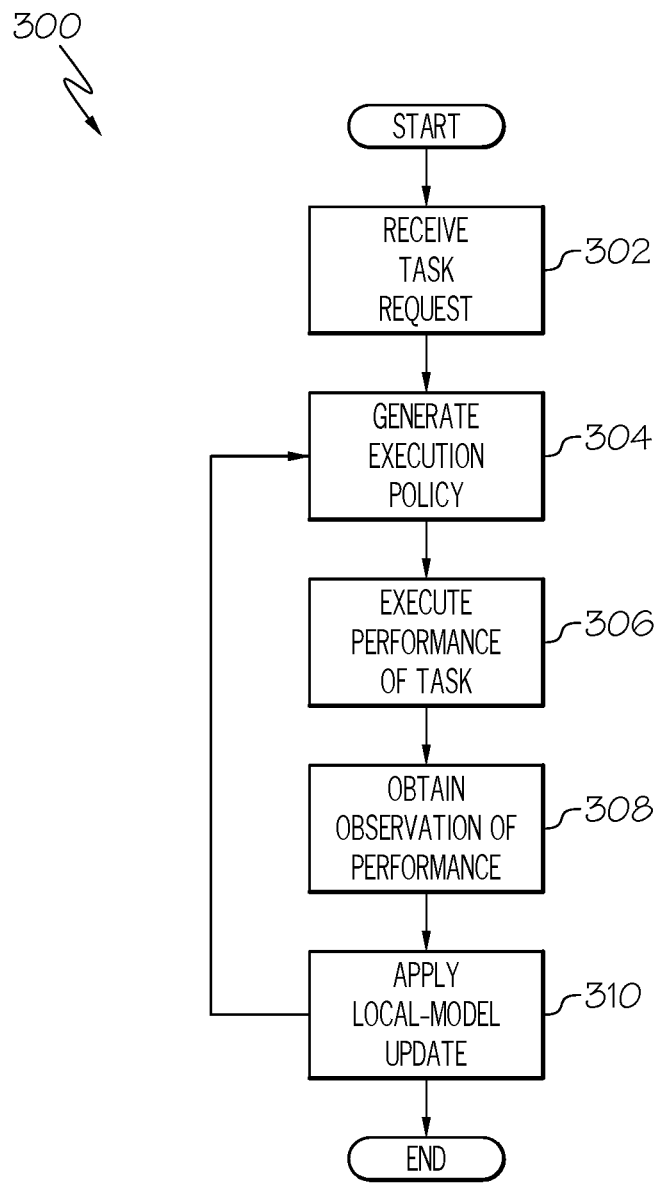
FIG. 3 depicts a flowchart of a method carried out by a task-execution device, according to one or more embodiments described and illustrated herein.

FIG. 3 depicts a flowchart of a method carried out by a task-execution device, according to one or more embodiments described and illustrated herein.

As shown, a method 300 begins at step 302 with task-execution device 102 receiving a task request identifying a requested task. The task could include task-execution device 102 moving to a given location, or task-execution device 102 manipulating or grabbing one or more objects, among other possibilities. For example, the task could include task-execution device 102 taking a left turn (e.g., if the task-execution device is an automobile), traversing a maze from an origin to a destination, or locating a given object and moving the object to a specific location, among other possibilities.

The task request could be received from task-execution devices 104 or 106, or from other entities of task-execution system 100, as examples. The task-request could be received via communication interface 206 (e.g., over network 112), via user interface 208 (e.g., as a result of one or more inputs provided to the user interface by a user), or via other components of task-execution device 102, among other possibilities. The task request may take the form of a task-request message that identifies the requested task, and could include one or more packets, datagrams, data structures, other data, or any combination of these or other messages. It should be understood, however, that the task request need not take the form of a discrete message or data, and that the task request could be received in other ways without departing from the scope of the disclosure.

At step 304, task-execution device 102 generates an execution policy based on local model 122 and the task request received at step 302. For example, if the task is to navigate the task-execution device (in the form of a vehicle) to a given destination, and if the local model includes a constraint to avoid traveling on a given road, then the task-execution device may generate an execution policy for navigating the task-execution device to the given destination while avoiding travel on the given road. The local model may include many more concepts and constrains, as described above, and the task-execution device may generate the execution policy based on any one or more of these.

In an embodiment, the generated execution policy includes one or more actions. For example, an action could take the form of a trajectory of the task-execution device, and the generated execution policy could include multiple trajectories to be taken by the task-execution device for navigating the task-execution device to a given destination. If the local model includes a constraint to avoid traveling on a given road, then the actions could include a set of trajectories that excludes trajectories that would traverse the road to be avoided. If the local model includes other constraints, then generating the execution policy may include generating an execution policy that includes a set of one or more actions that do not violate the constraints.

At step 306, task-execution device 102 executes a performance of the requested task based on the execution policy generated at step 304. For example, if the requested task is to navigate the task-execution device to a given destination, then the task-execution device may navigate to the given destination based on the generated execution policy. Executing the performance of the requested task may include executing a performance of one or more actions included in the execution policy. For instance, if one or more of the actions included in the execution policy take the form of task-execution device 102 taking one or more trajectories, then executing the performance of the task may include the task-execution device taking one or more of the trajectories.

At step 308, task-execution device 102 obtains an observation of the performance of the requested task executed at step 306. The observation of the performance of the requested task could include an observation of a result of the performance of the requested task. For example, if the requested task is navigating the task-execution device to a given location, then obtaining the observation may involve obtaining an observation whether the task execution device successfully navigated to the given location. As another example, if the requested task is the task-execution device picking up an object and relocating the object to a given location, then obtaining the observation may involve obtaining an observation whether the task execution device successfully relocated the object to the given location. The result of the performance of the task could be a success result or a failure result, among other examples.

The observation of the performance of the requested task could include an observation of a performance of one or more actions included in the execution policy, and the result of the performance of the requested task could include a result of the performance of the actions. For example, if the requested task is navigating the task-execution device to a given location, and the execution policy generated at step 304 includes an action in the form of the task-execution device taking a given trajectory, then obtaining the observation of the performance of the task could include obtaining an observation of a result of the performance of the task-execution device taking the given trajectory. As another example, if the requested task is the task-execution device relocating an object to a given location, and if the execution policy generated at step 304 includes an action in the form of the task-execution device establishing a grip on the object using a robotic hand of the task-execution device, then obtaining the observation of the performance of the task could include obtaining a result of a performance of the grip—e.g., whether the task-execution device successfully gripped the object. The result of the performance of the action could be a success result or a failure result, as examples.

A failure result may occur if, for example, task-execution device 102 generates the execution policy or executes the performance of the task based (at least in part) on faulty data received from a sensor of the task-execution device. As another possibility, a failure result may occur if an actuator of task-execution device 102, used to execute the performance of the task, fails to act or fails to fully complete an action of the execution policy.

As a further possibility, executing the performance of the requested task may include executing a simulation of the requested task—e.g., a simulation executed based on various combinations of sensors of task-execution devices and/or a simulation executed with sources of noise. The result of the simulation may be a probability that the result of the performance of the action will be a failure result. The probability of the failure result could be based on a probability that one or more components of task-execution device 102 or another task-execution device will fail—such as one or more actuators or sensors—or based on a probability that a given action (such as an action in the generated execution policy) will fail. For instance, the probability of the failure result could be based on a probability of obtaining erroneous input from an accelerator pedal, determined perhaps based on sensors and noise that may exist in the sensors related to the accelerator pedal.

As shown in FIG. 3, after obtaining the observation at step 308, task-execution device 102 may again generate an execution policy at step 304. For instance, based on the observation obtained at step 308, task-execution device 102 may generate a second execution policy. In an example, a requested task is to navigate task-execution device 102 to a given location, and a first execution policy generated at step 304 includes an action in the form of task-execution device 102 taking a left turn at a given intersection. If a result of a performance of this action obtained at step 308 is a failure result, then task-execution device 102 may generate a second execution policy with the constraint that a left turn should not be taken at the given intersection. This constraint could be in addition to any constraints included in the first execution policy, since the second execution policy (like the first execution policy) may be based on local model 122 and the requested task, and thus may include constraints similar to those in the first execution policy (which was generated based on local model 122 and the requested task). In another example, a requested task is for task-execution device 102 to relocate an object to a given location, and a first execution policy generated at step 304 includes an action in the form of task-execution device 102 attempting a first type of grip on the given object using a robotic hand. If a result of a performance of this action obtained at step 308 is a failure result, then task-execution device 102 may generate a second execution policy with the constraint that the task-execution device should not attempt the first type of grip on the object. The second execution policy could include several actions in the form of attempting respectively different grips on the object other than the constrained grip. Other examples are possible as well. In addition to generating the second execution policy, the task-execution device may revert to a state prior to executing the performance of the task (e.g., by moving the task-execution device to a start location or moving a robotic hand to a start location).

Constraints may already be present when generating the first execution policy. Local model may include knowledge of failures that may occur when particular actions occur. Knowledge may be provided via user interface.

At step 306, task-execution device 102 may execute a second performance of the requested task based on the second execution policy, and at step 308, the task-execution device may obtain an observation of the second performance of the requested task. Task-execution device 102 could also generate a third execution policy based on the obtained observation of the second performance of the requested task (and further based on local model 122 and the requested task), and could execute a third performance of the requested task based on the third execution policy and obtain an observation of the third performance of the requested task. As will be understood by those of skill in the art, these steps could be repeated any number of times (or not repeated at all) without departing from the scope of the disclosure.

At step 310, task-execution device 102 applies a local-model update to local model 122 based on the observation of the performance of the requested task obtained at step 308. The local-model update could take the form of a constraint, and applying the local-model update could include adding the constraint to the local model. For example, if the execution policy generated at step 304 includes an action in the form of task-execution device 102 taking a left turn at a given intersection, and if an observed result of a performance of this action obtained at step 308 is a failure result, then the local-model update could take the form of a constraint that a left turn should not be taken at the given intersection during a given time of day or during periods of heavy traffic, as example.

In some embodiments, task-execution device 102 both generates a second execution policy and applies a local-model update, both based on the observation of the performance of a requested task obtained at step 308. In an example, a requested task takes the form of task-execution device 102 navigating to a given location, and the execution policy generated at step 304 includes an action in the form of task-execution device 102 taking a left turn at a given intersection. An observed result of a performance of the left turn obtained at step 308 is a failure result. Based on the failure result, task-execution device 102 generates a second execution policy with the constraint that a left turn should not be taken at the given intersection, and task-execution device 102 executes a second performance of the requested task based on the second execution policy. The task-execution device also applies a local-model update to the local model based on the failure result. The local-model update takes the form of a constraint that a left turn should not be taken at the given intersection during periods of heavy traffic, and applying the update takes the form of adding the constraint to the local model.

As another possibility, applying the local-model update could include removing a constraint from local model 122, removing a first constraint and adding a second constraint to the local model, modifying a constraint of the local model, or any combination of these. Applying the local-model update could include adding, removing, and/or modifying concepts, rules, maps, perceived scenes, and/or pose estimations, among numerous other possibilities and combinations, as will be understood by those of skill in the art.

Task-execution device 102 may also send, to global-model repository 108, an indication of the update to local model 122. The indication could include an indication of a constraint, concept, etc. added to, removed from, or modified in local model 122, or could include an indication of the constraints, concepts, etc. of local model 122 subsequent to applying the update, as just a few possibilities.

Example Global-Model Repository and Model-Repository Method

Figure 4:
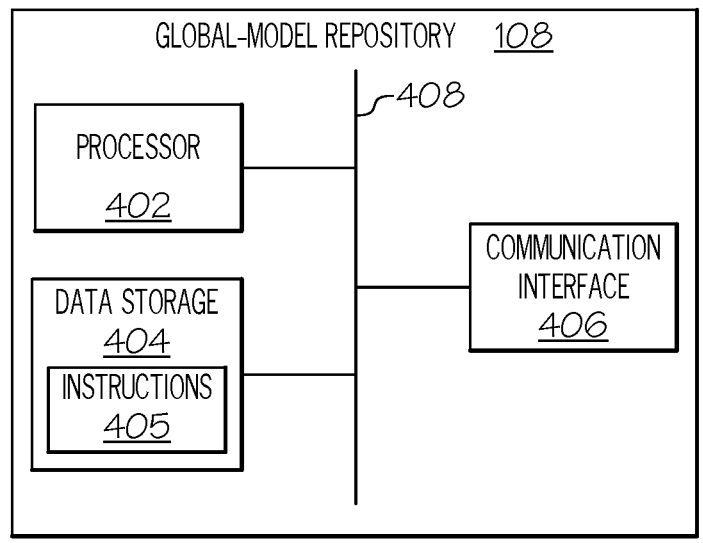
FIG. 4 depicts a block diagram of a global-model repository, according to one or more embodiments described and illustrated herein.

FIG. 4 depicts a block diagram of a global-model repository, according to one or more embodiments described and illustrated herein. As shown, global-model repository 108 includes a processor 402, a data storage 404 containing instructions 405, and a communication interface 406, each of which are communicatively connected via a system bus 408. Those of skill in the art will appreciate that global-model repository 108 may include different and/or additional components without departing from the scope of the disclosure.

Processor 402, data storage 404, instructions 405, communication interface 406, and system bus 408 may take a form similar to processor 202, data storage 204, instructions 405, communication interface 206, and system bus 210, respectively, described above with reference to FIG. 2. For example, data storage 404 may store instructions 405, data representing global model 128, and/or other data, as examples. Data representing global model 128 could be stored as a table, a flat file, or another form similar to that of the data representing local model 122, among other possibilities. Instructions 405 may be executable by processor 402 and, when executed by the processor, may cause global-model repository 108 to perform one or more of the global-model-repository functions described herein. The instructions could take the form of (or include) machine-language or script instructions, as described above. System bus 408 may be configured to transfer data between processor 402, data storage 404, communication interface 406, and/or any other component of global-model repository 108. Those of skill in the art will appreciate that these components could take other forms as well.

Figure 5:
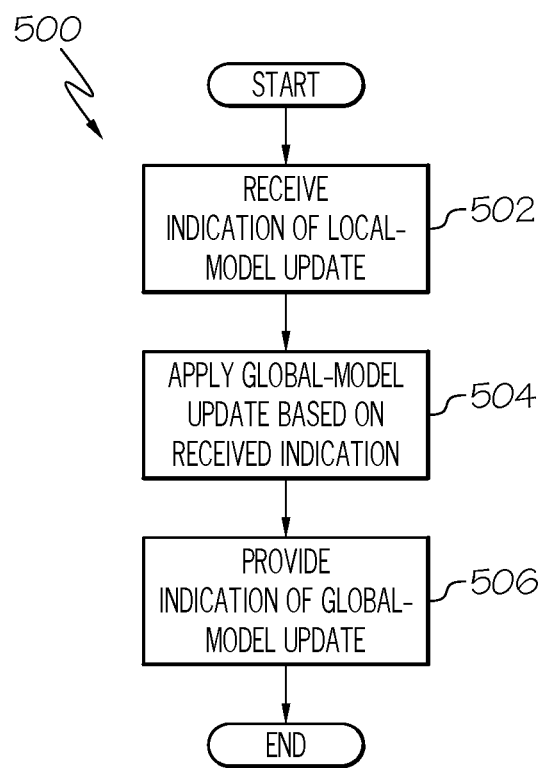
FIG. 5 depicts a flowchart of a method carried out by a global-model repository, according to one or more embodiments described and illustrated herein.

FIG. 5 depicts a flowchart of a method carried out by a global-model repository, according to one or more embodiments described and illustrated herein.

As shown, a method 500 begins at step 502 with global-model repository 108 receiving an indication of a local-model update to local model 122 of task-execution device 102. The local-model update could take the form of the local-model update described above with respect to step 310 of method 300, and the received indication could take the form of the indication provided to global-model repository 108 by task-execution device 102 described in an example above with respect to step 310, among other possibilities. The indication could be received as a message that includes the indication; the message could be received over network 112 via communication interface 406, for example.

At step 504, global-model repository 108 applies a global-model update to global model 128. The global-model update could take the form of one or more constraints, concepts, rules, maps, perceived scenes, pose estimations, etc., and applying the global-model update to global model 128 could include adding the constraints (etc.) to the global model, removing the constraints from the local model, removing a first constraint and adding a second constraint, modifying a constraint, or any combination of these, among numerous other possibilities.

Global-model repository 108 applies the global-model update in step 504 based on the local model update indicated at step 502. In an example, the local-model update includes a constraint that a left turn should not be taken at a given intersection during periods of heavy traffic. Based on this local-model update, global-model repository 108 may apply a global-model update that takes the form of (or includes) a constraint that no unprotected left turns should be taken at intersections in a given geographic area during periods of heavy traffic (e.g., in a busy metropolitan area such as lower Manhattan).

At step 506, global-model repository provides, to task-execution devices 104 and 106, an indication of the global-model update applied at step 504. The indication could include an indication of a constraint, concept, etc., added to, removed from, or modified in global model 128, or could include an indication of the constraints, concepts, etc., of global model 128 subsequent to applying the global-model update at step 504, among other possibilities.

Example Execution-System Method

Figure 6:
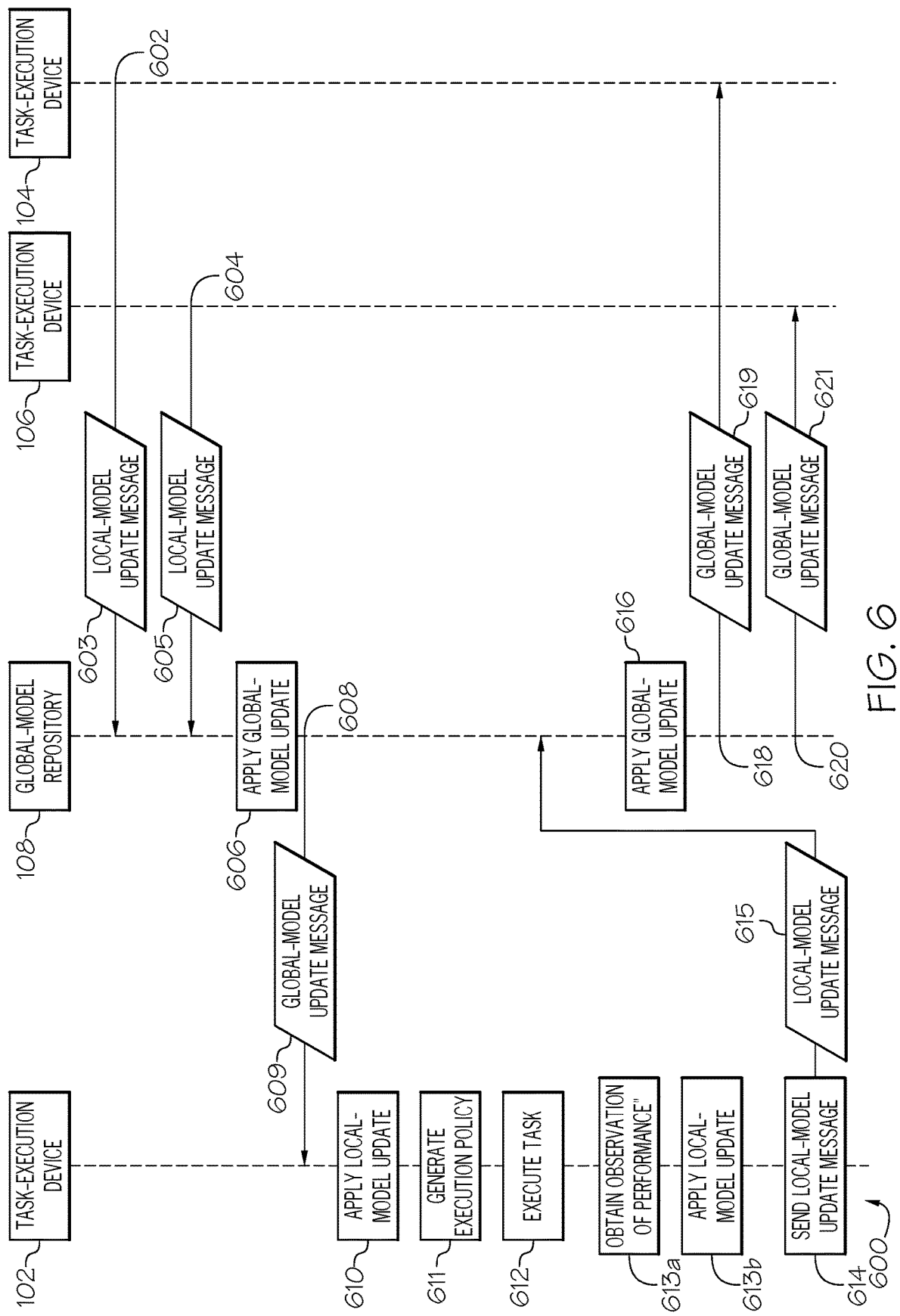
FIG. 6 depicts a sequence diagram of a method carried out by a task-execution system, according to one or more embodiments described and illustrated herein.

FIG. 6 depicts a sequence diagram of a method carried out by a task-execution system, according to one or more embodiments described and illustrated herein.

As shown, a method 600 begins at steps 602 and 604 with task-execution devices 104 and 106 providing, to global-model repository 108, indications of local-model updates to local models 124 and 126, respectively. Global-model repository 108 receives the respective indications from task-execution devices 104 and 106. In the embodiment illustrated in FIG. 6, providing the indications includes task-execution devices 104 and 106 sending local-model update messages 603 and 605, which include the indications of the local-model updates to local models 124 and 126, respectively. Additionally, in the illustrated embodiment, receiving the indications includes global-model repository 108 receiving the local-model update messages, which include respective indications of the local-model updates.

At step 606, global-model repository 108 applies a first global-model update to global model 128 based on either or both of the local-model updates to local models 124 and 126—e.g., as indicated by local-model update messages 603 and 605 received at steps 602 and 604.

In an example, the local-model update to local model 124 includes a constraint that a left turn should not be taken at a given intersection during periods of heavy traffic. Based on the received indication of this local-model update, global-model repository 108 determines that the intersection is located in lower Manhattan. Global-model repository 108 then applies a global-model update, based on the local-model update to local model 124, which includes a constraint that no unprotected left turns should be taken at intersections in lower Manhattan during periods of heavy traffic. In this example, global-model repository 108 applies the global-model update by adding the constraint to global model 128. In this example, the global-model update is not based on the local-model update to local model 126, though in other embodiments, the global-model update may be based on the local-model updates to both of local models 124 and 126, or may be based on the local-model update to local model 126 but not based on the local-model update to local model 124. Other examples are possible as well.

At step 608, global-model repository 108 provides, to task-execution device 102, an indication of the global-model update applied to global model 128 at step 606. Additionally, at step 608, task-execution device 102 receives the indication from global-model repository 108. In the illustrated embodiment, providing the indication includes global-model repository 108 sending a global-model update message 609 that includes the indication, and receiving the indication includes receiving the global-model update message that includes the indication.

The indication could be provided to task-execution device 102 in response to global-model repository 108 updating global model 128. As another possibility, the indication could be provided in response to global-model repository 108 receiving a request from task-execution device 102 for updates to global model 128. The received request could include a request for an indication or respective indications of any constraints, etc. added to global model 128 at step 606, any constraints added to the global model since a given point in time, or a number of most-recently-added constraints to the global model. The received request could include a request for any constrains modified or removed from the global model. The received request could include a request for any constrains matching one or more criteria, such as one or more constraints that apply to a given geographic area (such as lower Manhattan). The received request could include a request for all constraints that may be part of the global model after the first global-model update is applied. The request could include a request for one or more rules, maps, or scenes, as examples. The request could take other forms as well.

At step 610, task-execution device 102 applies a first local-model update to local model 122 based on the first global-model update to global model 128—e.g., as indicated by global-model update message 609 received by task-execution device 102 at step 608.

As one possibility, applying the global-model update at step 606 may include adding a given constraint to global model 128, and applying the local-model update at step 610 may include adding that constraint to local model 122. As another possibility, applying the global-model update at step 606 may include adding a given constraint to global model 128, and applying the local-model update at step 610 may include adding a constraint to local model 122 that is based on the constrain added to global model 128. In an illustration, applying the global-model update at step 606 includes adding a constraint to global model 128 that no unprotected left turns should be taken at intersections in lower Manhattan during periods of heavy traffic. In response to receiving the indication of the first global-model update at step 608, task-execution device 102 determines that the device is located in lower Manhattan. Based on the constraint added to global model 128, and further based on the determined location, task-execution device 102 applies a first local-model update to local model 122 by adding a constraint to the local model that unprotected left turns should not be taken during periods of heavy traffic.

As a further possibility, applying the global-model update at step 606 may include replacing all constraints of local model 122 with one or more constraints of global model 128. For example, task-execution device 102 could replace all constrains of local model 122 with one or more constraints of global model 128 that may be applicable to a current location of task-execution device 102 (e.g., all constraints applicable to lower Manhattan). Other examples are possible as well.

At steps 611-613*b*, task-execution device 102 performs a task-execution-device method, such as method 300 described above with reference to FIG. 3. The method includes task-execution device 102 applying a second local-model update to local model 122.

In an example, at step 611, task-execution device 102 generates an execution policy based on a requested task and local model 122 that includes the first local-model update applied to the local model at step 610. For instance, task-execution device 102 could receive a task request identifying a requested task that includes navigating the task-execution device to a given location, and the generated execution policy could include an action in the form of the task-execution device taking a given trajectory at minimum threshold speed when the task-execution device is on a road in front of a given primary school. At step 612, the task-execution device executes a performance of the requested task based on the generated execution policy, and at step 613*a*, obtains an observation of the performance of the task. For instance, the task-execution device may obtain a failure result for the action of taking the trajectory just described.

In this example, at step 613*b*, task-execution device 102 applies a second local-model update to local model 122 based on the observation of the performance of the requested task. For instance, based on the obtained failure result for the action of taking the given trajectory at the given minimum speed on the road in front of the given primary school, task-execution device 102 may apply the second local-model update by adding a constrain to the local model that the given trajectory should not be taken on the road when the school is in session.

At step 614, task-execution device 102 provides global-model repository 108 with an indication of the second local-model update applied to local model 122 at step 612. Additionally, global-model repository 108 receives the indication from task-execution device 102. In the illustrated embodiment, providing the indication includes task-execution device 102 sending a local-model update message 615 that includes the indication, and receiving the indication includes receiving the local-model update message that includes the indication.

At step 616, global-model repository 108 applies a second global-model update to global model 128 based on the second local-model update to local model 122—e.g., as indicated by local-model update message 615 received by the global-model repository from task-execution device 102 at step 614.

Continuing with the example above, the second local-model update to local model 122 includes the constraint that a given trajectory should not be taken on a road in front of a given primary school when the school is in session. Based on the received indication of this local-model update, global-model repository 108 determines that the primary school (and the road in front of the primary school) is located in midtown Manhattan. Global-model repository 108 then applies a second global-model update, based on the second local-model update to local model 122, which includes a constraint that the given trajectory should not be taken in front of any primary schools in midtown Manhattan when primary schools in midtown Manhattan are typically in session. In this example, global-model repository 108 applies the second global-model update by adding the constraint to global model 128.

At steps 618 and 620, global-model repository 108 provides, to task-execution devices 104 and 106, respective indications of the second global-model update applied to global model 128 at step 616. Additionally, task-execution devices 104 and 106 receive the indications from global-model repository 108 at steps 618 and 620, respectively. In the illustrated embodiment, providing the indications includes global-model repository 108 sending, to task-execution devices 104 and 106, global-model update messages 619 and 621 (respectively) that include the indications. Either or both of task-execution devices 104 and 106 could update their respective local models 124 and 126 based on the second global-model update.

In some embodiments, the task-execution system may learn sources of error that may lead to a failure result. For example, system 100 may learn the probabilities of errors or failure results through iterations of executing a performance of a task and/or executing a performance of an action (such as an action of a generated execution policy). These probabilities may be included in global model 128, respective local models of task-execution devices, or a combination of these, and these probabilities may be distributed (through local-model updates and global-model updates) to local models of other task-execution devices. In an embodiment, the execution policy is generated and/or the performance of the task is executed based (at least in part) on probabilities learned by the task-execution system.

Second Example Execution-Device Method

Figure 7:
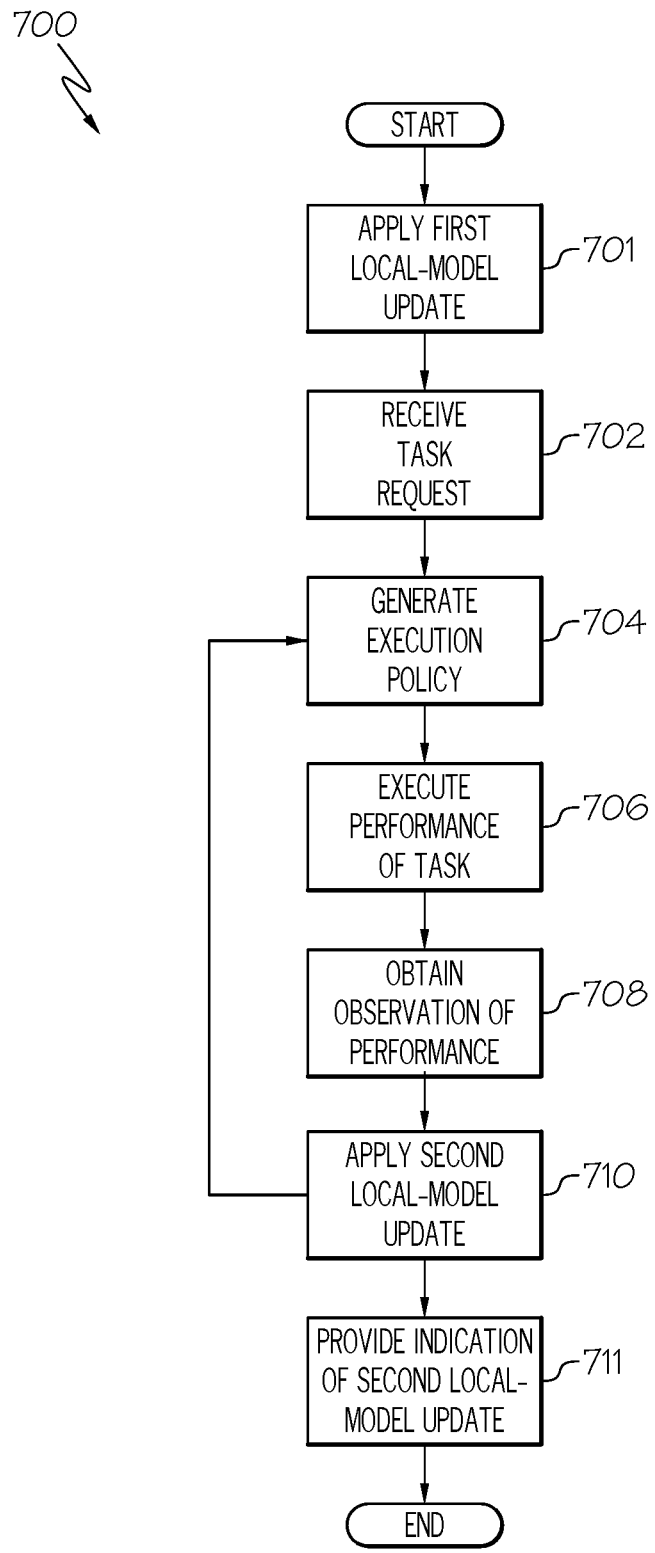
FIG. 7 depicts a flowchart of a method carried out by a task-execution device, according to one or more embodiments described and illustrated herein.

FIG. 7 depicts a flowchart of a method carried out by task-execution device 102, according to one or more embodiments described and illustrated herein.

As shown, a method 700 begins at step 701 with task-execution device 102 applying a first local-model update to local model 122 based on a first global-model update applied to global model 128 by global-model repository 108. The first global-model update may have been applied by global-model repository 108 in a manner similar to that described above with respect to step 606 of method 600, for example. For instance, the first global-model update may be based on one or more local-model updates to local models 124 and 126 of task-execution devices 104 and 106, respectively, or based on one or more local-model updates to respective local models of one or more other task-execution devices other than task-execution device 102, among other possibilities. Task-execution device 102 may apply the first local-model update in a manner similar to that described above with respect to step 610 of method 600, for example.

At steps 702 and 704, task-execution device 102 generates an execution policy based on (i) a received task request identifying a requested task and (ii) local model 122 that includes the first local-model update applied to the local model at step 701. In the illustrated embodiment, the task-execution device receives the task request at step 702 and generates the execution policy at step 704, and these steps may be carried out by the task-execution device in a manner similar to steps 302 and 304, respectively, as described above with respect to method 300 and elsewhere in this disclosure.

At step 706, task-execution device 102 executes a performance of the requested task based on the execution policy generated at step 704, and at step 708, task-execution device 102 obtains an observation of the performance of the requested task executed at step 706. At step 710, the task-execution device applies a second local-model update to local model 122 based on the observation of the performance obtained at step 708. Steps 706, 708, and 710 may be carried out by the task-execution device in a manner similar to steps 306, 308, and 310, respectively, as described above with respect to method 300 and elsewhere in this disclosure, and steps 704, 706, and 708 may be carried one or more times, as described above.

At step 711, task-execution device 102 provides global-model repository 108 with an indication of the second local-model update applied to local model 122 at step 710. The indication of the second local-model update may be provided in a manner similar to that described above with respect to step 614 of method 600. The provided indication of the second local-model update may cause global-model repository 108 to apply a second global-model update to global model 128 based on the second local-model update—for example, as described above with respect to step 616 of method 600.

CONCLUSION

It should now be understood that one or more embodiments described herein are directed to task-executions systems, task-execution devices, and methods for performing a task based on a global model. In some embodiments, a task-execution device applies a first local-model update to a local model of the task-execution device. The first local-model update is applied based on a first global-model update to a global model of a global-model repository, which in turn may be based on one or more local-model updates to respective local models of one or more devices other than the task-execution device. The task-execution device generates an execution policy based on (i) a received task request identifying a requested task and (ii) the local model including the first local-model update. The task-execution device executes a performance of the requested task based on the generated execution policy, and obtains an observation of the performance of the requested task. The task-execution device applies a second local-model update to the local model based on the obtained observation, and provides the global-model repository with an indication of the second local-model update, which may cause the global-model repository to apply a second global-model update to the global model based on the second local-model update.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method carried out by a task-execution device, the method comprising:
receiving, from a global-model repository in response to a request from the task-execution device matching a one or more criteria, a first global-model update message comprising a first indication of one or more changes to one or more constraints of a global model, wherein the one or more changes to the one or more constraints of the global model is based on a plurality of local-model updates applied on respective plurality of other task-execution devices, wherein the plurality of local-model updates includes updates to one or more environmental concepts and perceived environmental objects understood by each task-execution devices of the plurality of other task-execution devices matching the one or more criteria;
applying a first local-model update to a local model of the task-execution device, wherein the first local-model update is applied based on the first indication such that the local model of the task-execution device conforms with the one or more constraints of the global model;
generating an execution policy based on (i) a received task request identifying a requested task and (ii) the local model comprising the first local-model update;
determining a probability that a result of a performance of the requested task, based on the generated execution policy, will be a failure result;
applying a second local-model update adding a constraint to the local model based on the determined probability; and
providing the global-model repository with a second indication of the second local-model update.

2. The method of claim 1, further comprising:
executing a simulation of the requested task and determining the probability that the result of the performance of the requested task will be the failure result based on results of the simulation.

3. The method of claim 2, further comprising:
determining the probability that the result of the performance of the requested task will be the failure result based on a probability that one or more components of the task-execution device will fail.

4. The method of claim 1, further comprising:
performing a plurality of executions of the requested task based on the execution policy;
observing whether each execution of the requested task results in the failure result; and
determining the probability that the result of the performance of the requested task will be the failure result based on observations of the plurality of executions of the requested task.

5. The method of claim 1, wherein
the execution policy includes a set of one or more actions that do not violate the constraint.

6. The method of claim 1, further comprising:
obtaining an observation of the performance of the requested task;
generating a second execution policy based on the obtained observation of the performance of the requested task; and
executing a second performance of the requested task based on the generated second execution policy.

7. The method of claim 6, wherein generating the second execution policy based on the obtained observation of the performance of the requested task comprises generating the second execution policy based on (i) the received task request identifying the requested task, (ii) the local model comprising the first local-model update, and (iii) the obtained observation of the performance of the requested task.

8. The method of claim 1, wherein the provided second indication causes the global-model repository to apply a second global-model update to the global model based on the second local-model update.

9. The method of claim 1, further comprising:
reverting the task-execution device to a state prior to executing the performance of the requested task.

10. The method of claim 1, wherein the task-execution device includes one or more robotic components for grabbing an object, and the result of the performance of the requested task will be the failure result such that the one or more robotic components fails to act or fully complete an action of the execution policy in grabbing the object.

11. A task-execution device comprising:
a local model;
a processor; and
a non-transitory computer-readable storage medium comprising instructions that, when executed by the processor, cause the task-execution device to:
receive, from a global-model repository in response to a request from the task-execution device matching a one or more criteria, a first global-model update message comprising a first indication of one or more changes to one or more constraints of a global model, wherein the one or more changes to the one or more constraints of the global model is based on a plurality of local-model updates applied on respective plurality of other task-execution devices, wherein the plurality of local-model updates includes updates to one or more environmental concepts and perceived environmental objects understood by each task-execution devices of the plurality of other task-execution devices matching the one or more criteria;
apply a first local-model update to the local model of the task-execution device, wherein the first local-model update is applied based on the first indication such that the local model of the task-execution device conforms with the one or more constraints of the global model;
generate an execution policy based on (i) a received task request identifying a requested task and (ii) the local model comprising the first local-model update;
determine a probability that a result of a performance of the requested task, based on the generated execution policy, will be a failure result;
apply a second local-model update adding a constraint to the local model based on the determined probability; and
provide the global-model repository with a second indication of the second local-model update, wherein the provided second indication causes the global-model repository to apply a second global-model update to the global model based on the second local-model update.

12. The task-execution device of claim 11, wherein:
the instructions cause the task-execution device to execute a simulation of the requested task and determine the probability that the result of the performance of the requested task will be the failure result based on results of the simulation.

13. The task-execution device of claim 11, wherein the instructions further cause the task-execution device to:
obtain an observation of the performance of the requested task;
generate a second execution policy based on the obtained observation of the performance of the requested task; and
execute a second performance of the requested task based on the generated second execution policy.

14. A task-execution system comprising:
a task-execution device; and
a global-model repository comprising a global model, a processor, and a non-transitory computer-readable storage medium comprising model-repository instructions that, when executed by the processor, cause the global-model repository to:
apply a first global-model update to the global model based on one or more local-model updates to respective local models of one or more devices other than the task-execution device,
wherein the task-execution device comprises a local model, a processor, and a non-transitory computer-readable storage medium comprising execution-device instructions that, when executed by the processor, cause the task-execution device to:
receive, from the global-model repository in response to a request from the task-execution device matching a one or more criteria, a first global-model update message comprising a first indication of one or more changes to one or more constraints of the global model, wherein the one or more changes to the one or more constraints of the global model is based on a plurality of local-model updates applied on respective plurality of other task-execution devices, wherein the plurality of local-model updates includes updates to one or more environmental concepts and perceived environmental objects understood by each task-execution devices of the plurality of other task-execution devices matching the one or more criteria;
apply a first local-model update to the local model of the task-execution device, wherein the first local-model update is applied based on the first indication such that the local model of the task-execution device conforms with the one or more constraints of the global model;
generate an execution policy based on (i) a received task request identifying a requested task and (ii) the local model comprising the first local-model update;
determine a probability that a result of a performance of the requested task, based on the generated execution policy, will be a failure result; and
apply a second local-model update adding a constraint to the local model based on the determined probability,
wherein the model-repository instructions further cause the global-model repository to:
apply a second global-model update to the global model based on the second local-model update.

15. The task-execution system of claim 14, wherein:
the model-repository instructions further cause the global-model repository to receive local-model update messages from the one or more devices other than the task-execution device, wherein each of the received local-model update messages comprises a second indication of a respective local-model update among the one or more local-model updates,
the model-repository instructions that cause the global-model repository to apply the first global-model update based on the one or more local-model updates comprise instructions that cause the global-model repository to apply the first global-model update based on the one or more local-model updates indicated by the local-model update messages, and
the model-repository instructions further cause the global-model repository to send a global-model update message to the task-execution device, wherein the global-model update message comprises a third indication of the first global-model update.

16. The task-execution system of claim 14, wherein:
the model-repository instructions further cause the global-model repository to receive a local-model update message from the task-execution device, wherein the local-model update message comprises a second indication of the second local-model update, and
the model-repository instructions that cause the global-model repository to apply the second global-model update based on the second local-model update comprise instructions that cause the global-model repository to apply the second global-model update based on the second local-model update indicated by the local-model update message.

17. The task-execution system of claim 14, wherein:
the execution-device instructions cause the task-execution device to execute a simulation of the requested task and determine the probability that the result of the performance of the requested task will be the failure result based on results of the simulation.

18. The task-execution system of claim 17, wherein:
the execution policy includes a set of one or more actions that do not violate the constraint.

19. The task-execution system of claim 14, wherein the execution-device instructions further cause the task-execution device to:
obtain an observation of the performance of the requested task;
generate a second execution policy based on the obtained observation of the performance of the requested task; and
execute a second performance of the requested task based on the generated second execution policy.

* * * * *